United States Patent [19]

Biggerstaff

[11] 4,218,430

[45] Aug. 19, 1980

[54] PROCESS FOR THE PRODUCTION OF POROUS METAL OXIDE MICROSPHERES AND MICROSPHERES PRODUCED BY SAID PROCESS

[75] Inventor: George E. Biggerstaff, Erwin, Tenn.

[73] Assignee: Nuclear Fuel Services, Inc., Rockville, Md.

[21] Appl. No.: 944,027

[22] Filed: Sep. 20, 1978

[51] Int. Cl.$^2$ ............................................ C01G 49/08
[52] U.S. Cl. ................................... 423/632; 423/261; 423/592; 423/594; 264/15; 264/44; 252/301.1 R; 252/301.1 S; 252/448
[58] Field of Search ............................. 423/632–634, 423/592, 594, 261; 264/15, 44; 252/301.1 R, 448, 301.1 S

[56] References Cited

U.S. PATENT DOCUMENTS

| | | | |
|---|---|---|---|
| 2,296,522 | 9/1942 | Hartley | 75/33 |
| 2,454,941 | 11/1948 | Pierce et al. | 252/448 |
| 2,492,808 | 12/1949 | Marisic et al. | 252/448 |
| 2,689,226 | 9/1954 | Hoekstra et al. | 252/442 |
| 2,897,159 | 7/1959 | Hoekstra et al. | 252/448 |
| 2,939,767 | 6/1960 | Martin | 423/633 |
| 2,974,110 | 3/1961 | Callahan | 252/448 |
| 2,980,628 | 4/1961 | Smith | 252/359 |
| 3,023,171 | 2/1962 | Smith | 252/359 |
| 3,198,603 | 8/1965 | MacCallum et al. | 423/633 |
| 3,198,743 | 8/1965 | MacCallum et al. | 423/633 |
| 3,238,037 | 3/1966 | Sautier | 75/1 |
| 3,267,041 | 8/1966 | MacCallum | 423/633 |
| 3,290,122 | 12/1966 | Clinton et al. | 423/261 |
| 3,312,632 | 4/1967 | Smith | 252/301.1 |
| 3,331,785 | 7/1967 | Fitch et al. | 252/301.1 |
| 3,340,567 | 9/1967 | Flack et al. | |
| 3,345,437 | 10/1967 | Flack et al. | 264/0.5 |
| 3,352,635 | 11/1967 | Machin et al. | 264/44 X |
| 3,380,895 | 4/1968 | Flack et al. | 202/169 |
| 3,972,990 | 8/1976 | Vesely | 252/448 X |

FOREIGN PATENT DOCUMENTS 49-28957   7/1974   Japan ........................... 423/633

*Primary Examiner*—Earl C. Thomas
*Attorney, Agent, or Firm*—Jesse B. Grove, Jr.

[57] ABSTRACT

Low density, porous, metal oxide microspheres are prepared from metal salt solutions by sol-gel technique followed by ammonia treatment of the green microspheres, drying, impregnation with fugitive organic material and heat temperature under controlled conditions of temperature and atmosphere. The product metal oxide microspheres have a density of below 70% of their theoretical maximum density and a porosity of at least 0.04 cubic centimeters per gram as measured by mercury penetration technique. Microspheres of hematite, magnetite, and other metal oxides useful as catalysts or as purifying agents to remove contaminants from liquid or gaseous streams may be produced.

20 Claims, No Drawings

PROCESS FOR THE PRODUCTION OF POROUS METAL OXIDE MICROSPHERES AND MICROSPHERES PRODUCED BY SAID PROCESS

FIELD OF THE INVENTION

The invention relates to the production of porous, low density, metal oxide microspheres and, specifically, to the production of such microspheres starting with metal salt solutions.

DESCRIPTION OF THE PRIOR ART

Representative prior art patents are as follows:

U.S. Pat. No. 3,312,632 discloses a sol-gel process for making dense microspheres from metal oxide aquasols of the actinide series of metals for use as nuclear fuel. According to the process of this patent, microspheres having a high density core surrounded by an impervious oxide shell are formed by hot solvent dehydration of the metal oxide aquasol droplets. Ammonia releasing agents such as hexamethylenetetramine, acetamide, ammonium carbonate and the like are preferably added to the aquasol just prior to the introduction of the sol into a column containing a dehydration solvent such as hexanol. In the course of dehydration, the sol forms into microspheres which are subsequently treated with ammonia, washed, dried and sintered to form dense microspheres which are suitable for use in nuclear fuel elements.

U.S. Pat. No. 3,331,785 also discloses a hot solvent column drying technique for the preparation of microspheres from metal oxide aquasols. The process is exemplified with $UO_2$ and $UO_2$-$ZrO_2$ sols, but it is stated that the process may be extended to other oxide sols such as sols of alumina ($Al_2O_3$), titania ($TiO_2$), iron ($Fe_2O_3$) and the like. The green microspheres are sintered in hydrogen at high temperatures to form product microspheres of high densities.

The U.S. Pat. Nos. 3,198,603, 3,198,743 and 3,267,041 disclose the preparation of ferric oxide sols for use in the manufacture of pigments, polishing agents and magnetic materials such as ferrites and garnets.

U.S. Pat. No. 2,296,522 discloses that hematite ore may be converted to magnetic oxide form by subjecting it to a reducing roast at a temperature slightly above 750° F.

U.S. Pat. No. 3,238,037 discloses a process for producing ferromagnetic oxides from non-magnetic iron ores by heating the ore to a temperature of 1250°–1450° C. in an atmosphere of CO and $CO_2$. The ferromagnetic material, after size reduction, is used to prepare dense liquors for gravimetric separation processes.

U.S. Pat. No. 2,689,226 discloses the preparation of alumina spheres wherein an alumina sol is introduced into an oil bath to form spheres and the spheres are then aged in the oil bath and subsequently in an ammonia bath under conditions said to control porosity.

SUMMARY OF THE INVENTION

The present invention relates to the preparation of porous metal oxide microspheres of relatively low density. The product microspheres may be used for conventional applications in which metal oxide microspheres have been used before but are especially useful for applications in which particle porosity is desirable, as for example, in certain liquid purification procedures. Briefly, the process comprises preparation of a metal oxide sol, conversion of the sol to green microspheres, soaking the green microspheres in ammonium hydroxide solution, drying the ammonia treated microspheres, denitrating or otherwise purifying the dried spheres by heating them in air and subjecting them to further heat treatment under controlled conditions of temperature and gaseous atmosphere. To increase the porosity of the microspheres, they may be impregnated, either after drying or after purification, with an organic material which is molten and fluid at the temperature of impregnation, e.g. 100°–350° C., and which will decompose during subsequent heat treatment.

DETAILED DESCRIPTION

The process of this invention may be employed for the production of porous microspheres of a wide variety of metal oxides and mixtures thereof. The invention will be illustrated by reference to the production of porous hemitite and magnetite microspheres but is also applicable to production of microspheres of alumina ($Al_2O_3$), titania ($TiO_2$), urania ($UO_2$), urania-zirconia ($UO_2$-$ZrO_2$) as well as many others as will occur to those in the art.

The metal oxide sol and preparation of the green microspheres from such sol may be accomplished by conventional sol-gel techniques known in the art, such as by the procedures of the above-mentioned U.S. Pat. Nos. 3,312,632 and 3,331,785, the disclosures of which are incorporated herein by reference. A preferred procedure will also be described below. The most important features of the invention reside in the treatment of the green microspheres whereby metal oxide microspheres of the desired density and porosity are produced. The product microspheres have a particle size within the range of 50 to 1200 microns, a density less than about 70% and preferably, no more than about 50% of the theoretical maximum density, and a porosity greater than about 0.04 cubic centimeters per gram (cc/gm) as measured by the mercury penetration technique.

This result is accomplished by soaking the green microspheres in concentrated ammonium hydroxide for approximately one-half to one hour, washing the ammonia treated spheres followed by drying at relatively low temperature, e.g. below about 150° C. and preferably at about 120° C., preferably at sub-atmospheric pressure, impregnating the resulting microspheres with a fugitive organic material in liquid or molten form, and then heating impregnated microspheres to remove the heat fugitive organic material and harden the product microspheres.

The open porosity of the metal oxide microspheres can be increased significantly by infiltrating the particles with a liquid heat fugitive organic material, such as a polyethylene glycol. The microspheres are prepared, vacuum dried and optionally denitrated by heating in air. They are then immersed in the liquid organic material at a suitable temperature where the organic is molten and fluid (for example, Carbowax 4000° at 140° C.). The vessel containing the organic and particles may be evacuated to promote removal of air and gases from the particles and to permit greater penetration by the organic liquid after the vacuum is removed. The process works for particles that have been dried but have not been denitrated prior to the infiltration as well as for those which have been subjected to denitration.

The technique of inducing and/or controlling open porosity in the microspheres by heating with a heat fugitive organic material is not limited to Carbowax (polyethylene glycol). Many other compounds are suitable, more or less, for this use. Representative of these are:

| | |
|---|---|
| Glycerol | Mannitol |
| Dextrose | Palmitic Acid |
| Stearic Acid | Quinone |
| Ascorbic Acid | Salicylic Acid |
| Citric Acid | Sorbic Acid |
| Biphenyl | Polyvinyl Alcohol |
| Resorcinol | Polyethylene |
| Benzoic Acid | Polypropylene |
| Phthalic Acid | Polystyrene |
| Glutaric Acid | Polypropylene Glycol |
| Malic Acid | |

The choice of the organic material will depend upon such factors as availability, cost, ease of liquifaction and impregnation. The organic material should be one which will form non-toxic gases or vapors upon heating, either by volatilization or by decomposition, so as to scour or otherwise act upon the particles without causing fragmentation. Preferably, to avoid generation of toxic gases, the heat fugitive material will contain only the elements hydrogen and carbon or hydrogen, carbon and oxygen.

After impregnation, excess organic material is removed and the particles are heated slowly past the decomposition point of the organic material in a $CO_2$ atmosphere and finally to a temperature in the 800°–1100° C. range. After holding this temperature for a suitable time (usually ½ to 4 hours), air is gradually bled in and the $CO_2$ flow is gradually reduced until an air atmosphere exists. Heating is continued in air for a suitable time (usually ½ to 4 hours).

At this point, if the metal oxide starting material is iron oxide, the product is a porous hematite. If desired, this product can be converted to porous magnetite microspheres by heating at 400° to 1000° C. in a mixture of CO and $CO_2$. In tests where $CO_2$ and air firings were at 1050° C. and conversion to magnetite was at 600° C. with a $CO/CO_2$ ratio of 1:8, the product had a bulk density of 1.8 g/cc and a porosity of 0.12 cc/g by mercury penetrometer.

As aforestated, the green microspheres are contacted with concentrated ammonium hydroxide prior to drying them. This step has been found important as a means of preventing the microsphere particles from splitting and cracking during the subsequent heating stages.

After the ammonium hydroxide soak and drying step, the microspheres may be denitrated by heating in air at a temperature up to 600° C. prior to impregnating them with organic material.

The density of the microspheres is decreased and the porosity of the microspheres is increased by conducting the denitration at the lowest practical temperature to achieve the necessary denitration. Likewise, where porous hematite microspheres are converted to porous magnetite microspheres, it is preferable to conduct the reduction at the lowest practical temperature to achieve the necessary conversion.

Preferably, both denitration and reduction stages are conducted at temperatures of about 400° C.–600° C. and the reduction stage is accomplished with a mixture of carbon dioxide and carbon monoxide in which the $CO/CO_2$ ratio is in the approximate range of 1:4 to 1:8 $CO/CO_2$ by volume. These values, as well as heating time periods, can readily be adjusted to provide optimum product characteristics. The heating stages are generally accomplished within one-half to one hour each. Higher heating temperatures and longer time cycles result in product spheres of increased density.

At higher reduction temperatures the ratio of $CO_2$ to CO should be increased to insure proper equilibrium conditions for conversion to magnetite, e.g. at 600° C. the $CO_2/CO$ ratio should be approximately 8 to 1.

It has been observed that the surface characteristics and porosity of magnetite microspheres may be further improved by interposing a preliminary reduction step with an atmosphere of hydrogen or hydrocarbon gases prior to the $CO/CO_2$ conversion stage. For example, the microspheres just prior to conversion to magnetite may be reduced in an atmosphere of hydrogen at 900°–1000° C. followed by an air atmosphere for 1 to 5 minutes or may be treated with natural gas at a temperature of 400°–600° C. prior to conversion of the iron to magnetite in the $CO/CO_2$ atmosphere. Where this treatment is conducted with hydrocarbon gases some cracking of the hydrocarbon with deposition of carbon on the particle surface occurs which is then removed during the $CO/CO_2$ treatment with concomitant alteration of the surface characteristics of the product microspheres.

The heating procedures may be conducted by any of a number of techniques as will occur to those familiar with the art. For example, the process may be performed on a continuous basis during which the spheres, while moving through a furnace, are subjected first to a stream of heated air and then to a stream of heated reducing gas mixture. Alternatively, the spheres may be in the form of a fluidized or stationary bed while being subjected to a stream of hot air followed by a stream of reducing gas.

After heating, and reduction to magnetite in the case of iron oxide, the microspheres may be cooled and screened to remove broken particles.

It has been observed that the microspheres will split into generally hemi-spherical particles if they are given a further soak in concentrated ammonium hydroxide solution after the initial drying stage and prior to denitration. This technique may be used where smaller particles are desired and where spherical shape is not essential to the end use.

A representative embodiment of the invention is described below:

EXAMPLE 1

A solution of ferric nitrate is converted to ferric hydroxide $Fe(OH)_3$ by bubbling gaseous ammonia ($NH_3$) into the solution. The precipitated ferric hydroxide is centrifuged and washed with water several times to remove ammonium nitrate. The precipitate is then slurried with water at a concentration of about one mole of iron per liter. This is heated to about 80° C. and nitric acid or other acid is slowly added to peptize the ferric hydroxide and produce a stable sol.

Spherical particles are formed by injecting the sol into the top of a column of n-hexanol using a hypodermic needle. The sol is treated with a small amount of hexamethylenetetramine, prior to injection, as an internal gelling agent. The hexanol continuously flows into the bottom of the column at a temperature of about 82° C. and then flows out near the top. The hexanol entering the bottom of the column contains about 3% water.

The particles are removed from the column, soaked for one-half hour in concentrated ammonium hydroxide, washed, and vacuum dried at about 120° C.

The dried particles are denitrated in air at about 400° C. and then reduced to magnetite ($Fe_3O_4$) at about 400° C. in an atmosphere of carbon monoxide (CO) and carbon dioxide ($CO_2$) in a volume ratio of 1:4.

The particles are screened and passed over a vibrating rolling plane to remove broken and agglomerated pieces. This produces a clean fraction of spherical magnetite particles having a particle size in the range of 250–1100 microns, a density of about 2.6, i.e. 50% of the theoretical density of 5.2, and a porosity of approximately 0.04 cc/gm by mercury penetration technique.

EXAMPLE 2

The process of Example 1 is repeated up to the denitration step. The particles after the ammonium hydroxide soak and after drying in vacuum at 120° C. are placed in a bath of molten polyethylene glycol (Carbowax 4000 at 140° C.) in a vessel which can be closed and evacuated. The vessel is then evacuated to remove air and to facilitate impregnation of the microspheres when the vacuum is broken.

The microspheres are then removed from the bath of organic material and are allowed to drain while still at the temperature of the molten material. They are placed in a heating vessel and are gradually heated in a $CO_2$ atmosphere past the decomposition point of the polyethylene glycol and finally to a temperature of about 1050° C. This temperature is held for about two hours following which air is gradually bled into the vessel to replace the $CO_2$. Heating at approximately 1050° C. in air is continued for about two hours and the porous hematite microsphere product is gradually cooled.

EXAMPLE 3

The porous hematite microspheres, prepared as in Example 2, are converted to porous magnetite microspheres by further heating in a $CO/CO_2$ atmosphere, with a $CO/CO_2$ ratio of 1:8, at a temperature of 600° C. After cooling and screening, product magnetite microspheres having a bulk density of about 1.8 g/cc and a porosity of 0.12 cc/g by mercury penetration are obtained.

It will be understood that the ferric hydroxide sol and green microspheres produced therefrom may be prepared by other conventional sol-gel techniques.

Further, it will be understood that the time period of the ammonium hydroxide soak, the time periods and temperatures for the denitration and reduction stages as well as the ratio of $CO_2/CO$ may be varied to alter the density and other properties of the particles as may be desired.

While the invention has been described in terms of various preferred process parameters, and exemplified with respect thereto, the skilled artisan will appreciate that various substitutions, changes, omissions, and modifications may be made without departing from the spirit thereof. Accordingly, it is intended that the scope of the invention be limited solely by that of the following claims.

What is claimed is:

1. A process for producing porous metal oxide microspheres comprising: forming metal oxide microspheres from a metal oxide sol; soaking said microspheres in concentrated ammonium hydroxide solution; washing and drying the ammonia treated microspheres; impregnating the dried microspheres with a fugitive organic material; and subjecting the impregnated microspheres to heat treatment to remove the fugitive organic material and increase the porosity of the particles.

2. The process of claim 1 wherein the fugitive organic material is employed in liquid form and the microspheres are impregnated by immersion in said liquid material.

3. The process of claim 2 wherein said impregnation is facilitated by use of a vacuum.

4. The process of claim 1 wherein the microspheres, after impregnation, are heated in an atmosphere of carbon dioxide to a final temperature in the range of 800°–1100° C.

5. The process of claim 4 wherein the carbon dioxide atmosphere is gradually replaced with air while continuing the heating of the microspheres in the said temperature range.

6. The process of claim 1 wherein the fugitive organic material is a normally solid material having a melting point below about 350° C. and consisting of the elements hydrogen and carbon or hydrogen, carbon and oxygen.

7. The process of claim 1 wherein the ammonium hydroxide soak is conducted for a period of time of approximately one-half to one hour.

8. The process of claim 1 wherein the microspheres after the ammonium hydroxide soak followed by drying are denitrated by heating in air at a temperature below about 600° C.

9. The process of claim 8 wherein the denitrating temperature is approximately 400° C.

10. The process of claim 1 wherein a ferric hydroxide sol is used as the starting material and the microspheres are heated to convert them to hematite.

11. The process of claim 1 wherein a ferric hydroxide sol is used as the starting material, the microspheres are heated in a atmosphere of carbon dioxide followed by heating in air to convert the iron oxide to hematite form and the hematite microspheres are further heated in an atmosphere of carbon monoxide and carbon dioxide to convert the hematite to magnetite.

12. The process of claim 11 wherein the temperature during $CO/CO_2$ reduction is below about 600° C.

13. The process of claim 12 wherein the $CO/CO_2$ ratio of the reducing atmosphere is approximately 1:4 by volume and the temperature during this heating stage is approximately 400° C.

14. The process of claim 12 wherein the $CO/CO_2$ ratio of the reducing atmosphere is approximately 1:8 by volume and the temperature during this heating stage is approximately 600° C.

15. The process of claim 8 wherein the microspheres after denitration are subjected to hydrogen reduction followed by air exposure.

16. The process of claim 8 wherein the microspheres are subjected to treatment with hydrocarbon gases at temperatures in the range of 400° to 600° C. after denitration.

17. A process for the preparation of low porous density, magnetite microspheres from a starting solution of a ferric salt comprising: preparing a stable ferric hydroxide sol from said ferric salt solution; forming microspheres from said ferric hydroxide sol by hot solvent dehydration technique with internal gellation; soaking the solvent dehydrated microspheres for approximately one-half to one hour in concentrated ammonia solution; washing and drying the ammonia treated microspheres;

vacuum impregnating the dried microspheres with a fugitive organic material; heating the impregnated microspheres in an atmosphere of carbon dioxide to a temperature in the range of 800°–1100° C. followed by heating in air and subjecting the resulting microspheres to a reducing atmosphere of carbon monoxide and carbon dioxide in approximately 1:4 to 1:8 $CO/CO_2$ ratio by volume at a maximum temperature no higher than about 600° C. to convert the iron oxides of the microspheres to magnetite form.

18. Magnetite microspheres having a particle size in the range of 50 to 1200 microns, a density below 70% of the maximum theoretical density and a porosity greater than about 0.04 cc/gram as measured by mercury penetrometer.

19. Magnetite microspheres as claimed in claim 18 having a bulk density of approximately 1.8 g/cc and a porosity of about 0.12 cc/g as measured by mercury penetrometer.

20. Magnetite microspheres as produced by the process of claim 17.

* * * * *